United States Patent
Gill (10) Patent No.: US 6,256,178 B1
(45) Date of Patent: Jul. 3, 2001

(54) BIASING FOR TUNNEL JUNCTION HEAD

(75) Inventor: Hardayal Singh Gill, Portola Valley, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/280,423

(22) Filed: Mar. 29, 1999

(51) Int. Cl.⁷ ....................................................... G11B 5/39
(52) U.S. Cl. .................................. 360/324.2; 360/324.11; 360/324.12
(58) Field of Search ............................ 360/324.2, 324.11, 360/324.12

(56) References Cited

U.S. PATENT DOCUMENTS 5,898,548 * 4/1999 Dill et al. .

\* cited by examiner

*Primary Examiner*—Craig A. Renner
(74) *Attorney, Agent, or Firm*—Gray Cary Ware & Freidenrich; Ervin F. Johnston (57) ABSTRACT

A tunnel junction sensor with a track width area which balances a ferromagnetic coupling field with an opposed tunneling sense current field generated by a tunneling sense current to achieve biasing of the magnetic moment of the free layer in a tunnel junction head. The ferromagnetic coupling field is generated in the same direction as the magnetic moment of the pinned layer which is in close proximity to the free layer. Absent any external forces, the orientation of the magnetic moment of the free layer aligns with the orientation of the magnetic moment of the pinned layer. For the tunnel junction sensor to work efficiently, the orientation of the magnetic moment of the free layer should be perpendicular to the orientation of the magnetic moment of the pinned layer. To accomplish biasing the magnetic moment of the free layer in the desired direction, the tunneling sense current is directed in the plane of the conductive layer in such a direction parallel to the ABS so as to create a tunneling sense current field antiparallel to the ferromagnetic coupling field. By balancing these two opposed fields, the orientation of the magnetic moment of the free layer may be oriented perpendicular to the orientation of the magnetic moment of the pinned layer. To force the tunneling sense current to flow in the plane of the conducting layer parallel to the track width, a non-conducting layer located between the conductive layer and a lead wherein the lead is preferably a first shield layer of the sensor.

55 Claims, 7 Drawing Sheets

FIG. 11
(ABS VIEW)

FIG. 13
(ABS VIEW)

BIASING FOR TUNNEL JUNCTION HEAD

BACKGROUND OF THE INVENTION

1. Field of the Invention

The present invention relates to a tunnel junction sensor in a tunnel junction head, and more particularly, to biasing the orientation of the magnetic moment in the free layer in the tunnel junction head using a current field generated by a tunnel current.

2. Description of the Related Art

A read head employing a read sensor may be combined with an inductive write head to form a combined magnetic head. In a magnetic disk drive, an air bearing surface (ABS) of the combined magnetic head is supported adjacent a rotating disk to write information on or read information from the disk. Information is written to the rotating disk by magnetic fields which fringe across a gap between the first and second pole pieces of the write head. In a read mode, the resistance of the read sensor changes proportionally to the magnitudes of the magnetic fields from the rotating disk. When a current is conducted through the read sensor, resistance changes cause potential changes that are detected and processed as playback signals in processing circuitry.

One type of read sensor is a tunnel junction sensor. The details of tunnel junction have been described in a commonly assigned U.S. Pat. No. 5,650,958 to Gallagher et al., which is incorporated by reference herein. The tunnel junction sensor is a device comprised of two ferromagnetic layers (i.e., the pinned and free layers) separated by a thin barrier layer and is based on the phenomenon of spin-polarized electron tunneling. The typical tunnel junction sensor uses free and pinned layers, such as NiFe or CoFe, with a non-magnetic barrier layer therebetween that is thin enough to permit quantum mechanical sense current tunneling to occur through the barrier layer between the free and pinned layers. The pinned layer has a magnetic orientation pinned by exchange coupling with a pinning layer wherein the pinning layer is made of antiferromagnetic material with magnetic spins oriented in a predetermined direction. The tunneling phenomenon is electron spin dependent, making the magnetic response of the tunnel junction sensor a function of the relative orientations and spin polarization of the conduction electrons between the free and pinned layers. Ideally, the magnetic moment orientation of the pinned layer should be pinned 90° to the magnetic moment orientation of the free layer, with the magnetic moment of the free layer being free to respond to external magnetic fields such as fields from a rotating magnetic disk. In the absence of any external fields acting on the free layer, the magnetic moment of the free layer is parallel to the direction of the pinned layer, due to a ferromagnetic coupling therebetween.

From the above it becomes apparent that what is needed is a way of biasing the magnetic moment of the free layer such that it is normal to the magnetic moment orientation of the pinned layer in a tunnel junction head in the absence of the external field.

SUMMARY OF THE INVENTION

The present invention is directed to a tunnel junction sensor that employs the field generated from a tunneling sense current through one of the layers to counterbalance a ferromagnetic coupling field exerted on the free layer by the pinned layer. The ferromagnetic coupling field is parallel to the direction of the magnetic moment of a pinned layer. Absent any external forces, the orientation of the magnetic moment of the free layer is unfortunately parallel to the orientation of the magnetic moment of the pinned layer due to their close proximity. For the tunnel junction sensor to work efficiently, the orientation of the magnetic moment of the free layer should be perpendicular to the orientation of the magnetic moment of the pinned layer. To permit a desired orientation of the magnetic moment of the free layer, a tunneling sense current is provided that flows parallel to the ABS in the plane of a conductive layer so as to create a current field antiparallel to the ferromagnetic coupling field. By balancing these two opposed fields, the magnetic moment orientation of the free layer can be perpendicular to the magnetic moment orientation of the pinned layer. To get the tunneling sense current to flow in the plane of the conductive layer, as opposed to through the layer, a non-conducting layer is inserted into the structure. This non-conducting layer makes the current flow in the plane of the desired layer so as to generate the current field of sufficient magnitude to counter balance the ferromagnetic coupling field on the free layer.

In one embodiment, the current flows in the plane of a conductive pinned layer parallel to the ABS so as to create the desired current field. The tunnel junction sensor includes a first shield layer, a non-conductive antiferromagnetic pinning layer with magnetic spins aligned in a predetermined direction, a pinned layer made of conductive ferromagnetic material whose magnetic moment orientation is pinned by exchange coupling with the magnetic spins of the non-conductive antiferromagnetic pinning layer. This magnetization also generates a ferromagnetic coupling field in the predetermined direction. The pinned layer and the first shield are electrically connected in a location remote from the track width area. A non-magnetic barrier layer is positioned between the pinned layer and a free layer. The free layer is made of a ferromagnetic material with a magnetic moment orientation initially parallel to the pinned layer due to the ferromagnetic coupling field. The desired orientation of the free layer is perpendicular to that of the pinned layer magnetic moment orientation (i.e., parallel to the ABS).

In another embodiment, similar to the one described above, a non-conductive insulation layer is placed between the first shield layer and a conductive antiferromagnetic (AFM) pinning layer (which is used in place of the non-conductive pinning layer of the previous embodiment) with magnetic spins aligned in the predetermined direction. The pinning layer and the first shield are electrically connected remote from the track width area. The pinned layer is made of conductive ferromagnetic material whose magnetic moment orientation is pinned by exchange coupling with the conductive antiferromagnetic pinning layer. This magnetization causes the pinned layer to exert a ferromagnetic coupling field on the free layer that is directed perpendicular to the ABS. A non-magnetic barrier layer is positioned between the pinned layer and a free layer. The free layer is made of a ferromagnetic material with a magnetic moment orientation initially parallel to the magnetic orientation of the pinned layer due to the ferromagnetic coupling field. The desired magnetic moment orientation of the free layer is perpendicular to that of the magnetic moment orientation of the pinned layer (i.e., parallel to the ABS).

The first and second shield layers may be used as electrodes for the tunnel junction sensor. A tunneling sense current IT flows through the tunnel junction sensor from the second shield toward the first shield in the track width area, perpendicular to the plane of the films or layers, except the non-conductive layer. As the tunnel current reaches the non-conductive layer, the current turns and flows in the plane of the adjacent conductive layer and parallel to the ABS (either the pinning or pinned layer) and finally to the first shield which is connected to the conductive layer outside of the track width area. As the current flows in the plane of the conductive layer, a tunneling sensor current field is generated antiparallel to the ferromagnetic coupling field. Both of these fields influence the orientation of the magnetic moment of the free layer. By balancing these two fields, the orientation of the magnetic moment of the free layer can be directed perpendicular to the magnetic orientation of the pinned layer. As the tunnel junction sensor is positioned over a rotating magnetic disk, external magnetic fields sensed from the rotating disk moves the orientation of the magnetic moment of the free layer up or down, changing the resistance through the tunnel junction sensor. As the direction of the magnetic moment of the free layer rotates up from the ABS (i.e., going toward the opposite direction of an exemplary downwardly directed magnetic moment of the pinned layer), the amount of electron tunneling decreases (i.e., the resistance increases). As the direction of the magnetic moment of the free layer rotates down toward the ABS (i.e., going toward the same direction as the magnetic moment of the pinned layer) the amount of electron tunneling increases (i.e., the resistance decreases). As the tunneling sense current $I_T$ is conducted through the sensor, the increase and decrease of electron tunneling (i.e., increase and decrease in resistance) are manifested as potential changes. These potential changes are then processed as readback signals by the processing circuitry of the disk drive.

Other objects and advantages of the present invention will become apparent upon reading the following description taken together with the accompanying drawings.

DESCRIPTION OF THE PREFERRED EMBODIMENTS

Magnetic Disk Drive

Figure 1:
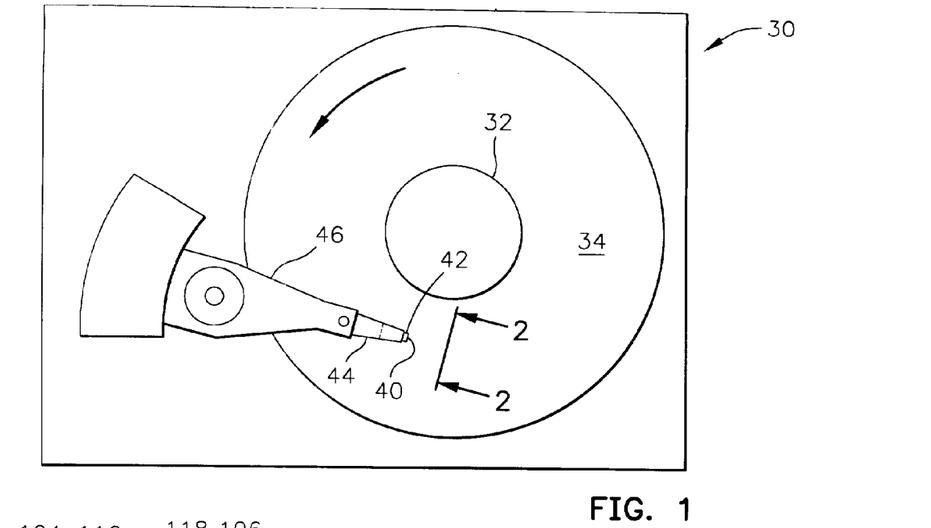
FIG. 1 is a plan view of an exemplary magnetic disk drive.
Figure 2:
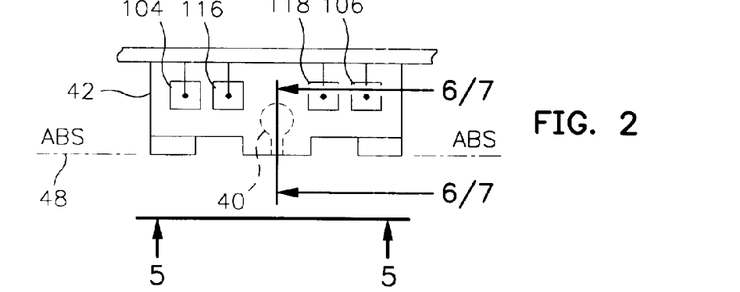
FIG. 2 is an end view of a slider with a magnetic head as seen in plane 2—2 of FIG. 1.
Figure 3:
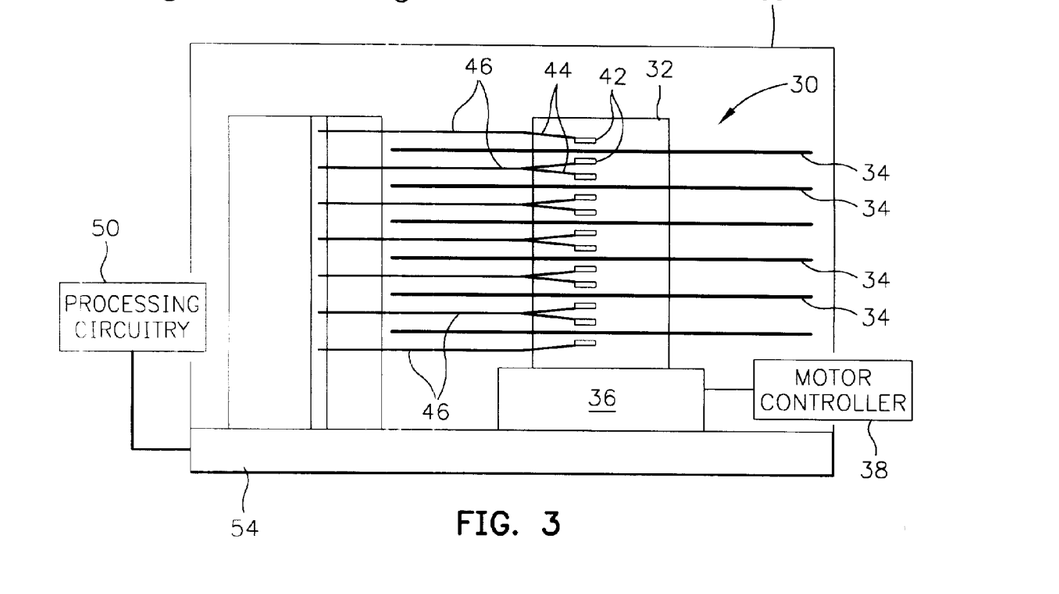
FIG. 3 is an elevation view of the magnetic disk drive wherein multiple disks and magnetic heads are employed.
Figure 4:
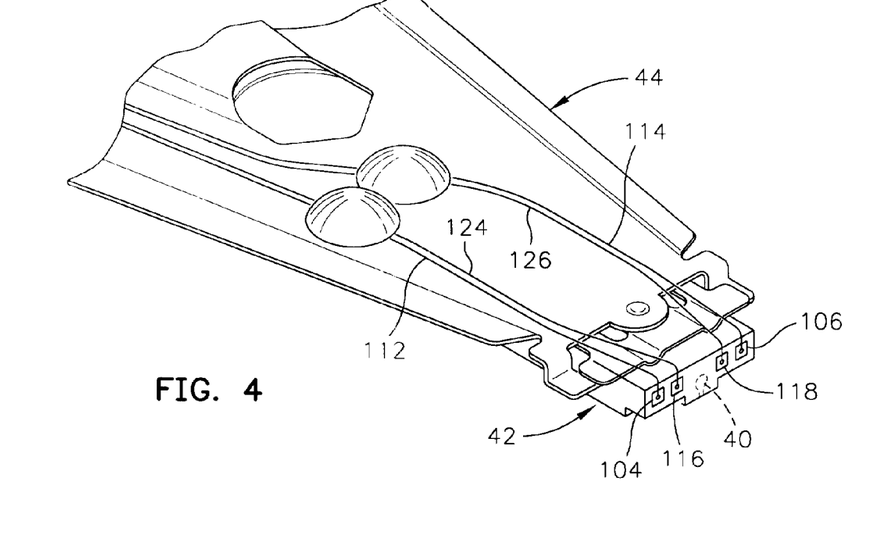
FIG. 4 is an isometric illustration of an exemplary suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a motor 36 that is controlled by a motor controller 38. A combined read and write magnetic head 40 is mounted on a slider 42 that is supported by a suspension 44 and actuator arm 46. A plurality of disks, sliders and suspensions may be employed in a large capacity direct access storage device (DASD) as shown in FIG. 3. The suspension 44 and actuator arm 46 position the slider 42 so that the magnetic head 40 is in a transducing relationship with a surface of the magnetic disk 34. When the disk 34 is rotated by the motor 36 the slider is supported on a thin (typically, 0.05 $\mu$m) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides motor drive signals for rotating the magnetic disk 34, and provides control signals for moving the slider to various circular tracks on the disk. FIG. 4 shows the mounting of the slider 42 to the suspension 44, which will be described hereinafter. The components described hereinabove may be mounted on a frame 54 of a housing 55, as shown in FIG. 3.

Figure 5:
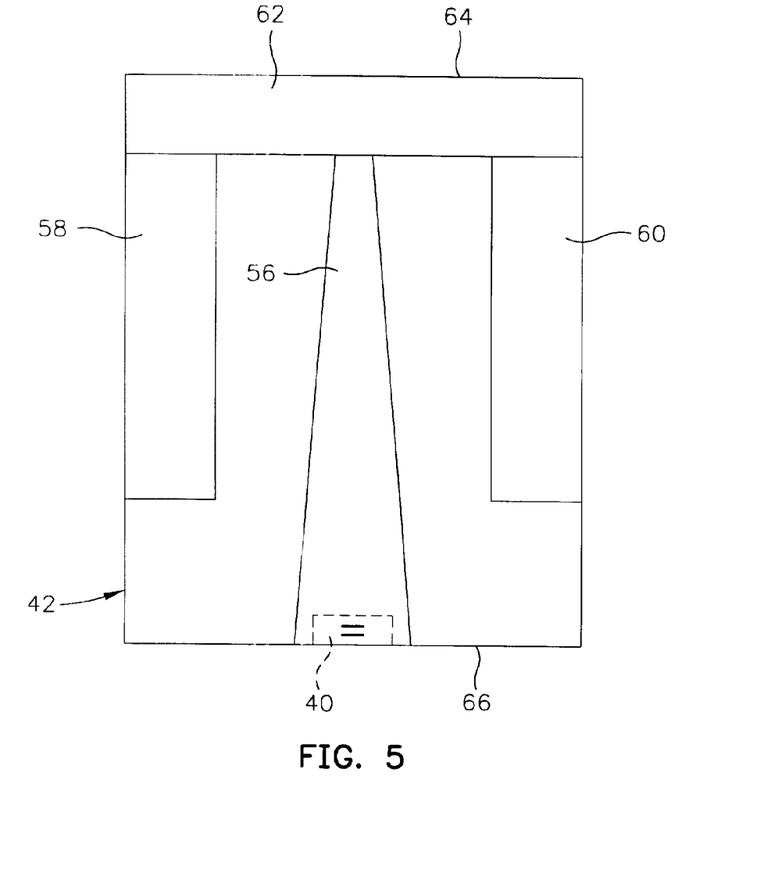
FIG. 5 is an ABS view of the slider taken along in plane 5—5 of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figure 6:
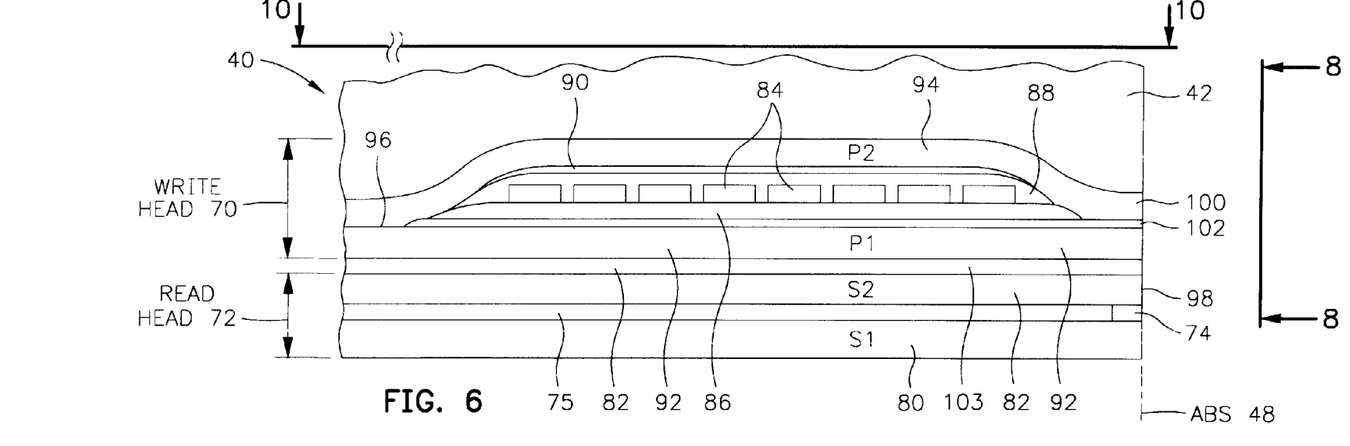
FIG. 6 is a partial view of the slider and a piggyback magnetic head as seen in plane 6—6 of FIG. 2.
Figure 8:
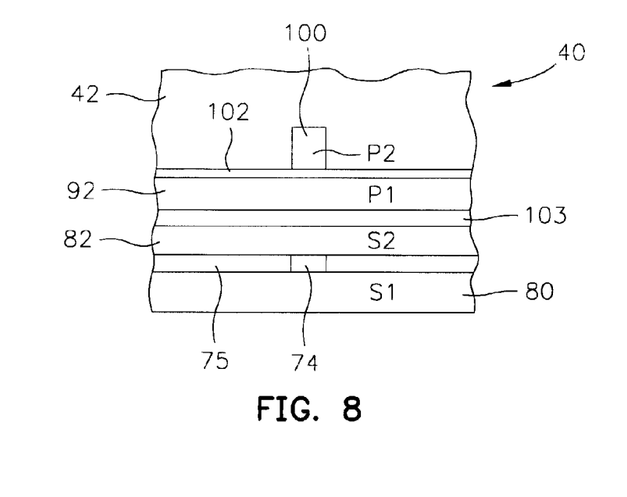
FIG. 8 is a partial ABS view of the slider taken along plane 8—8 of FIG. 6 to show the read and write elements of the piggyback magnetic head.

FIG. 6 is a side cross-sectional elevation view of a piggyback magnetic head 40, which includes a write head portion 70 and a read head portion 72, the read head portion employing an pinned spin valve sensor 74 of the present invention. FIG. 8 is an ABS view of FIG. 6. The spin valve sensor 74 and insulating gap payer 75 are sandwiched between first and second shield layers 80 and 82. The insulating gap layer 75 insulates the shields from each other and may be made from aluminum oxide, aluminum nitride or silicone dioxide. In response to external magnetic fields, the resistance of the spin valve sensor 74 changes. To determine the resistance, a tunneling sense current $I_T$ is used. The first and second shield layers 80 and 82 are employed as leads. As the magnetic moment of the free layer rotates in response to the magnetic field from the disk, the resistance of the tunnel junction structure changes, altering the current through the structure. These resistance changes to be manifested as potential changes. These potential changes are then processed as readback signals by the processing circuitry 50 shown in FIG. 3.

Figure 10:
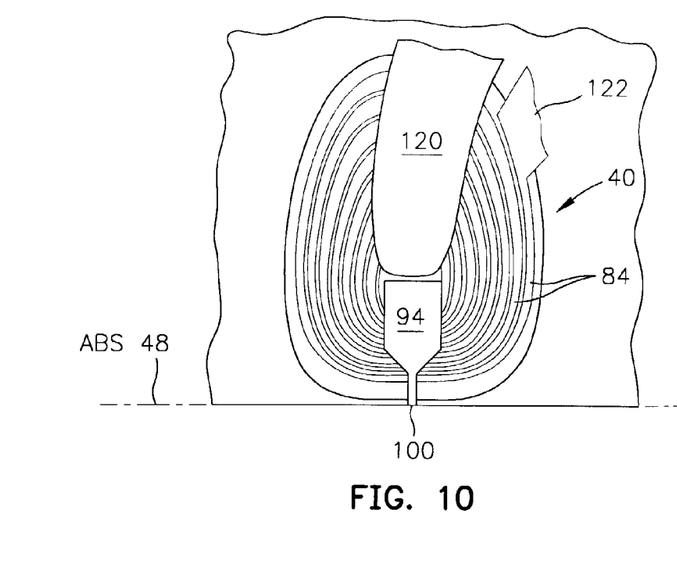
FIG. 10 is a view taken along plane 10—10 of FIGS. 6 or 7 with all material above the coil layer and leads removed.

The write head portion 70 of the magnetic head 40 includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. An insulation layer 103 is located between the second shield layer 82 and the first pole piece layer 92. Since the second shield layer 82 and the first pole piece layer 92 are separate layers this head is known as a piggyback head. As shown in FIGS. 2 and 4, first and second solder connections 104 and 106 connect leads from the spin valve sensor 74 to leads 112 and 114 on the suspension 44, and third and fourth solder connections 116 and 118 connect leads 120 and 122 from the coil 84 (see FIG. 10) to leads 124 and 126 on the suspension.

Figure 7:
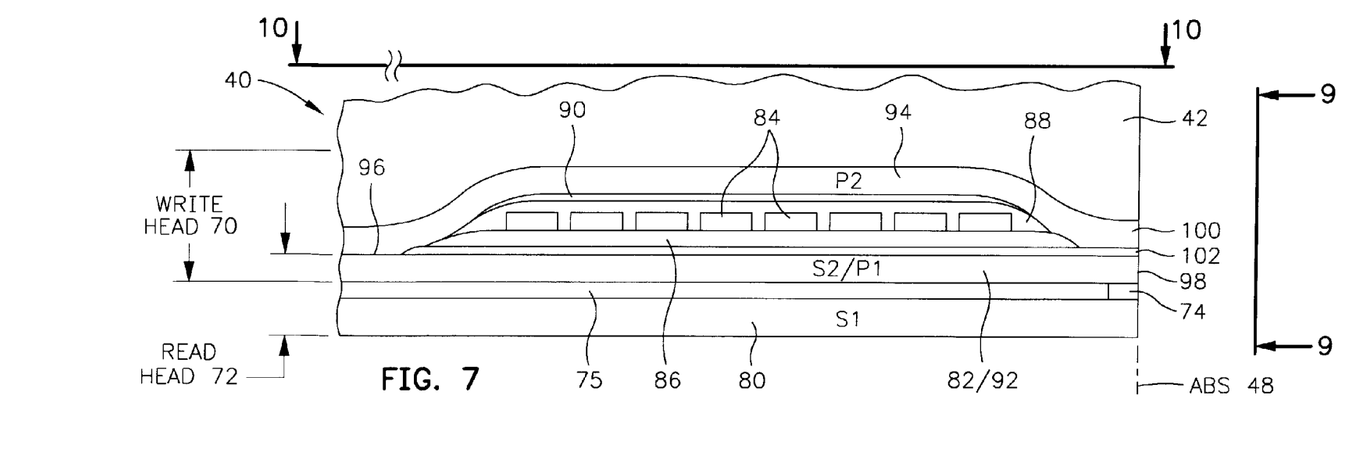
FIG. 7 is a partial view of the slider and a merged magnetic head as seen in plane 7—7 of FIG. 2.
Figure 9:
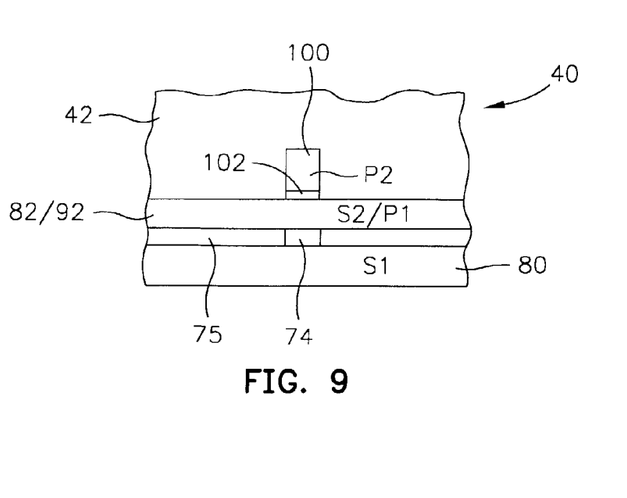
FIG. 9 is a partial ABS view of the slider taken along plane 9—9 of FIG. 7 to show the read and write elements of the merged magnetic head.

FIGS. 7 and 9 are the same as FIGS. 6 and 8 except the second shield layer 82 and the first pole piece layer 92 are a common layer. This type of head is known as the merged magnetic head. The insulation layer 103 of the piggyback head in FIGS. 6 and 8 is omitted.

Present Invention

The present invention is directed to a tunnel junction sensor that employs the field generated from a tunneling sense current through one of the layers to counterbalance a ferromagnetic coupling field exerted on the free layer by the pinned layer. The ferromagnetic coupling field is parallel to the direction of the magnetic moment of a pinned layer. Absent any external forces, the orientation of the magnetic moment of the free layer is parallel to the orientation of the magnetic moment of the pinned layer due to a ferromagnetic coupling field due to the close proximity of the pinned and free layers. To bias the orientation of the magnetic moment of the free layer in the desired direction, a tunneling sense current is provided that flows parallel to the ABS, in the plane of a conductive layer, so as to create a current field antiparallel to the ferromagnetic coupling field. By balancing these two opposed fields, the magnetic moment orientation of the free layer can be perpendicular to the magnetic moment orientation of the pinned layer. To get the tunneling sense current to flow parallel to the ABS in the plane of the conductive layer, as opposed to through the layer, a non-conducting layer is inserted into the structure. This non-conducting layer makes the current flow in the plane of the desired layer parallel to the ABS so as to generate the current field of sufficient magnitude to counter balance the ferromagnetic coupling field on the free layer.

Figure 11:
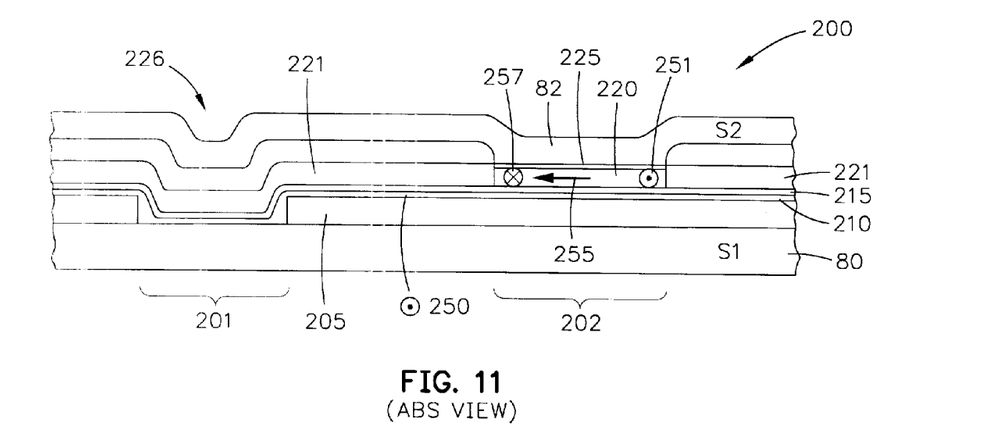
FIG. 11 is a partial air bearing surface (ABS) illustration of one embodiment of the sensor of the present invention.
Figure 12:
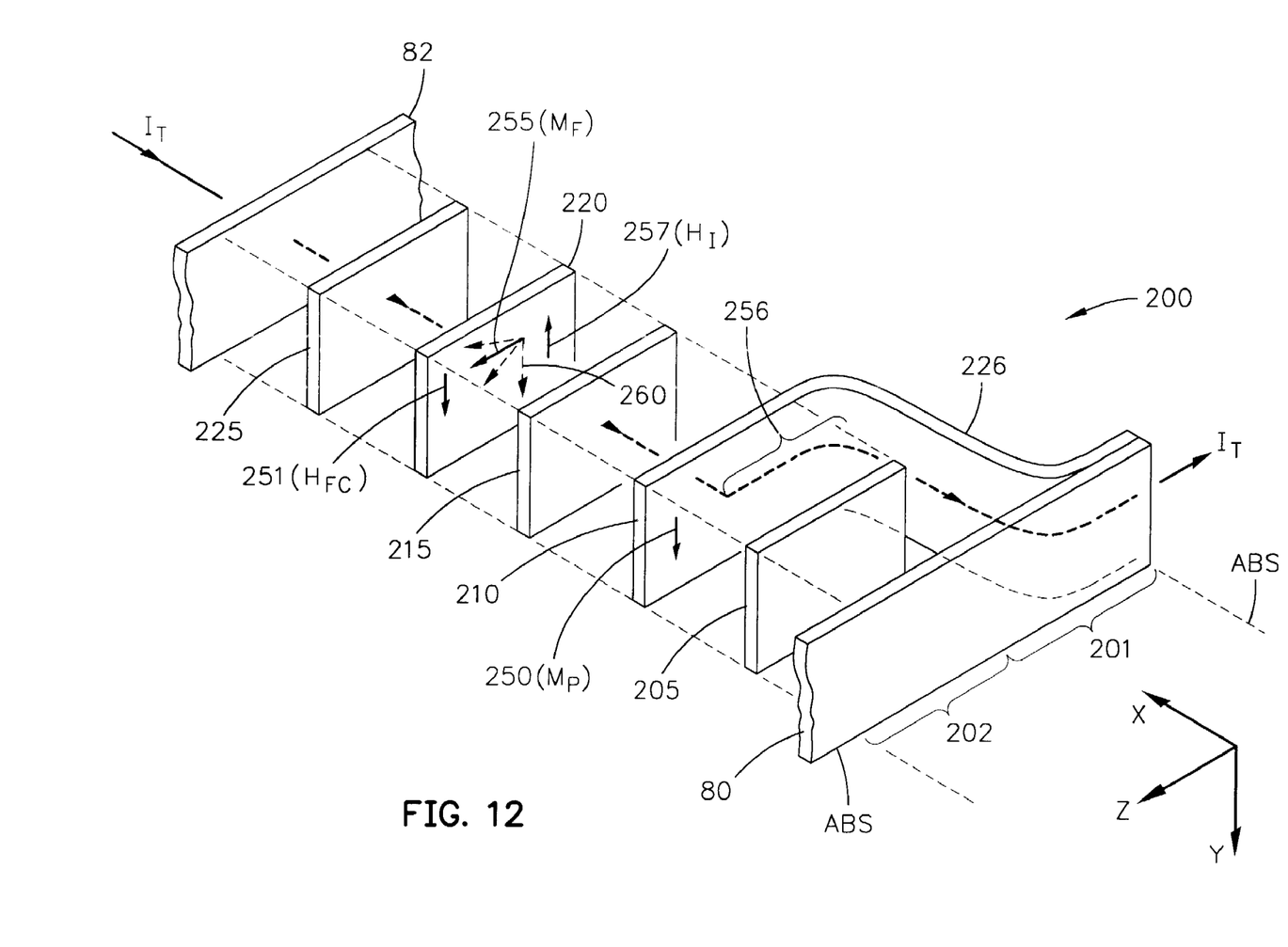
FIG. 12 is an exploded view of FIG. 11.

FIG. 11 shows one embodiment of the tunnel junction sensor 200 of the present invention which includes a first shield 80, a non-conductive pinning layer 205, a pinned layer 210, a barrier layer 215, a free layer 220, an isolation layer 225 and a second shield layer 82. Also shown are hard bias layers 221. The hard bias layers are used for free layer stabilization. FIG. 12 is an exploded view of FIG. 11 showing the layers and exemplary desired orientations of the magnetic moment ($M_P$) 250 of the pinned layer 210 and the magnetic moment ($M_F$) 255 of the free layer 220 in the absence of an external field. In this case, the magnetic moment ($M_P$) 250 of the pinned layer 210 is downward (+y direction), perpendicular to the ABS, the orientation of the magnetic moment ($M_P$) 250 being pinned by interfacial exchange coupling with the adjacent pinning layer 205. It is generally desirable for optimum performance that the orientation of the magnetic moment ($M_F$) 255 of the free layer 220 be perpendicular to the magnetic moment ($M_P$) 250 of the pinned layer 210 (i.e., the moment direction 255 is parallel to the ABS). But, it is apparent, as shown in FIG. 12, in the absence of any external magnetic fields, the orientation of the magnetic moment ($M_F$) 255 of the free layer 220 is parallel to the magnetic moment ($M_P$250, as shown at 260, due to a ferromagnetic coupling field ($H_{FC}$) 251 in the +y direction. To permit the magnetic moment ($M_F$) 255 to assume the preferred direction (i.e., perpendicular to the magnetic moment ($M_P$) 250), a magnetic field in the –y direction must be generated to counteract the ferromagnetic coupling field ($H_{FC}$) 251.

A tunneling sense current $I_T$, using spin dependent electron tunneling, flows through the tunnel junction sensor 200, parallel to the ABS, with the first and second shield layers 80 and 82 used as leads. In the present invention, the tunnel current $I_T$ does not flow in the AFM pinning layer 210 because the pinning layer 205 is non-conductive. The tunnel current $I_T$ is diverted 256, in the –z direction in the pinned layer 210, to the location where the pinned layer 210 and the first shield 80 are connected at 201 by the shunt 226 (i.e., away from the track width area 202). While the current 256 is flowing in the plane of the pinned layer 210 in the –z direction, a tunneling sense current field ($H_I$) 257 is generated antiparallel to the ferromagnetic coupling field ($H_{FC}$) 251. By balancing the tunneling sense current field ($H_I$) 257 and the ferromagnetic coupling field ($H_{FC}$) 251, the magnetic moment ($M_F$) 255 of the free layer 220 is located parallel to the ABS, as shown by the solid arrow. The electrical connection 201 between the pinned layer 210 and the first shield 80 is in an area outside the track width area 202 so that the current $I_T$ is conducted in the pinned layer 210 parallel to the ABS and parallel to the track width.

The amount of current $I_T$ that flows through the sensor is dependent on the relative magnetic directions ($M_P$) 250 and ($M_F$) 255 of the pinned layer and the free layer. As the tunnel junction sensor 200 is positioned over the magnetic disk 34, the external magnetic fields sensed from the rotating disk 34 moves the direction of magnetic moment ($M_F$) 255 of the free layer 220 up or down, changing the resistance through the tunnel junction sensor 200. As the magnetic moment ($M_F$) 255 rotates up from the ABS (i.e., going toward the opposite direction of the magnetic moment ($M_P$) 250), the amount of electron tunneling decreases (i.e., the resistance increases). As the magnetic moment ($M_F$) 255 rotates down toward the ABS (i.e., going toward the same direction as the magnetic moment ($M_P$) 250), the amount of electron tunneling increases (i.e., the resistance decreases). As the tunnel current $I_T$ is conducted through the sensor 200, the increase and decrease of electron tunneling (i.e., increase and decrease in resistance) are manifested as potential changes. These potential changes are then processed as readback signals by the processing circuitry shown in FIG. 3.

The first and second shields 80 and 82 are made from a conductive material, such as Permalloy which is $Ni_{80}Fe_{20}$. The pinning layer 205 is made of non-conductive material. such as nickel oxide (NiO), having a thickness range of 50–150 Å, preferably 100 Å. The non-conductive pinning layer 205 has its magnetic spins oriented in a preferred direction. The pinned layer 210 is made from a ferromagnetic material such as $Ni_{40}Fe_{60}$/Co or NiFe/$Co_{30}Fe_{70}$/Co with a thickness of 20–60 Å, preferably 40 Å. The pinned layer 210 is exchange coupled to the pinning layer 205 such that the orientation of the magnetic moment of the pinned layer is in the same direction as the magnetic spins of the pinning layer.

The pinned layer 210 is in electrical contact with the first shield 80 by a conductive shunt 226 that is located outside the track width area 202 at a location 201. The track width area 202 is defined by the width of the ferromagnetic free layer 220. The barrier layer 215 may be made of aluminum oxide, with a thickness of 10–30 Å, preferably 20 Å. The free layer 220 is made from ferromagnetic material such as Co/NiFe or Co/$Ni_{90}Fe_{10}$/$Ni_{40}Fe_{60}$ with a thickness of 20–60 Å, preferably 40 Å. An isolation layer 225, made of Tantalum (Ta) and having a thickness of 30–100 Å, preferably 50 Å, is placed between the free layer 220 and the second shield layer 82 for the purpose of preventing a magnetic coupling therebetween. The first and second shields 80 and 82 are used as leads for the tunnel junction sensor 200. The inductive write head 70 is then formed on the tunnel junction read sensor 200 (or read head 72, see FIG. 6 or 7). While the above description describes the construction of one embodiment of the present invention, there are other layers that may be added to improve the tunnel junction sensor 200.

To fabricate the tunnel junction 200, the first shield 80 is first deposited. Next is the AFM pining layer 205 deposited on the first shield. A via or shunt 226 is patterned in the pining layer 205. The pinned layer 210 is deposited on the pinning layer 205, with the pinned layer 210 making contact with the shield 80 in the via 226. The tunnel junction barrier layer 215 is deposited on the pinned layer 210. Using a lift-off technique, the free layer 220 is deposited on the barrier layer 215. The hard bias layer 221 and isolation layer 225 are then deposited. The second shield 82 is deposited on the isolation layer 225. Electrical current flows from the second shield 82 to the free layer 220 and then the current tunnels to the pinned layer 210 across the barrier 215. Current then flows parallel to the ABS in the pinned layer 210 to the via 226 and finally reaches the first shield 80 at 201.

Figure 13:
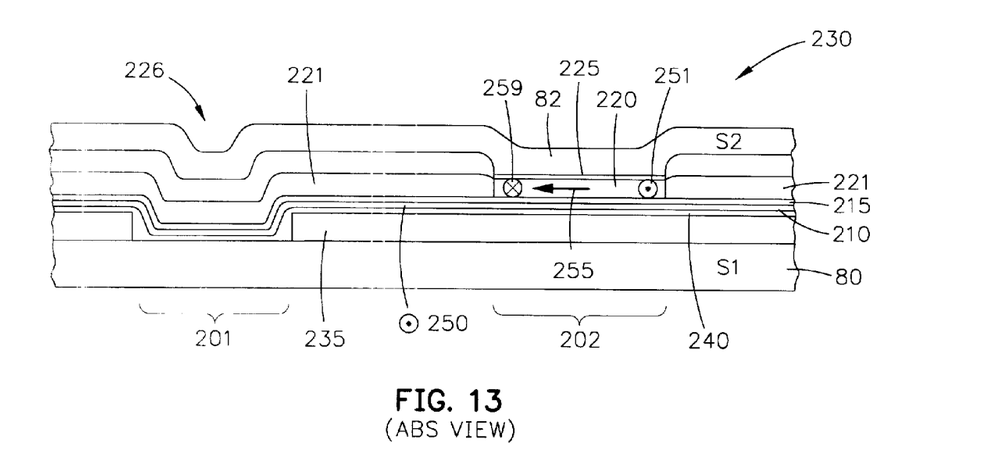
FIG. 13 is a partial ABS illustration of another embodiment of the sensor of the present invention.
Figure 14:
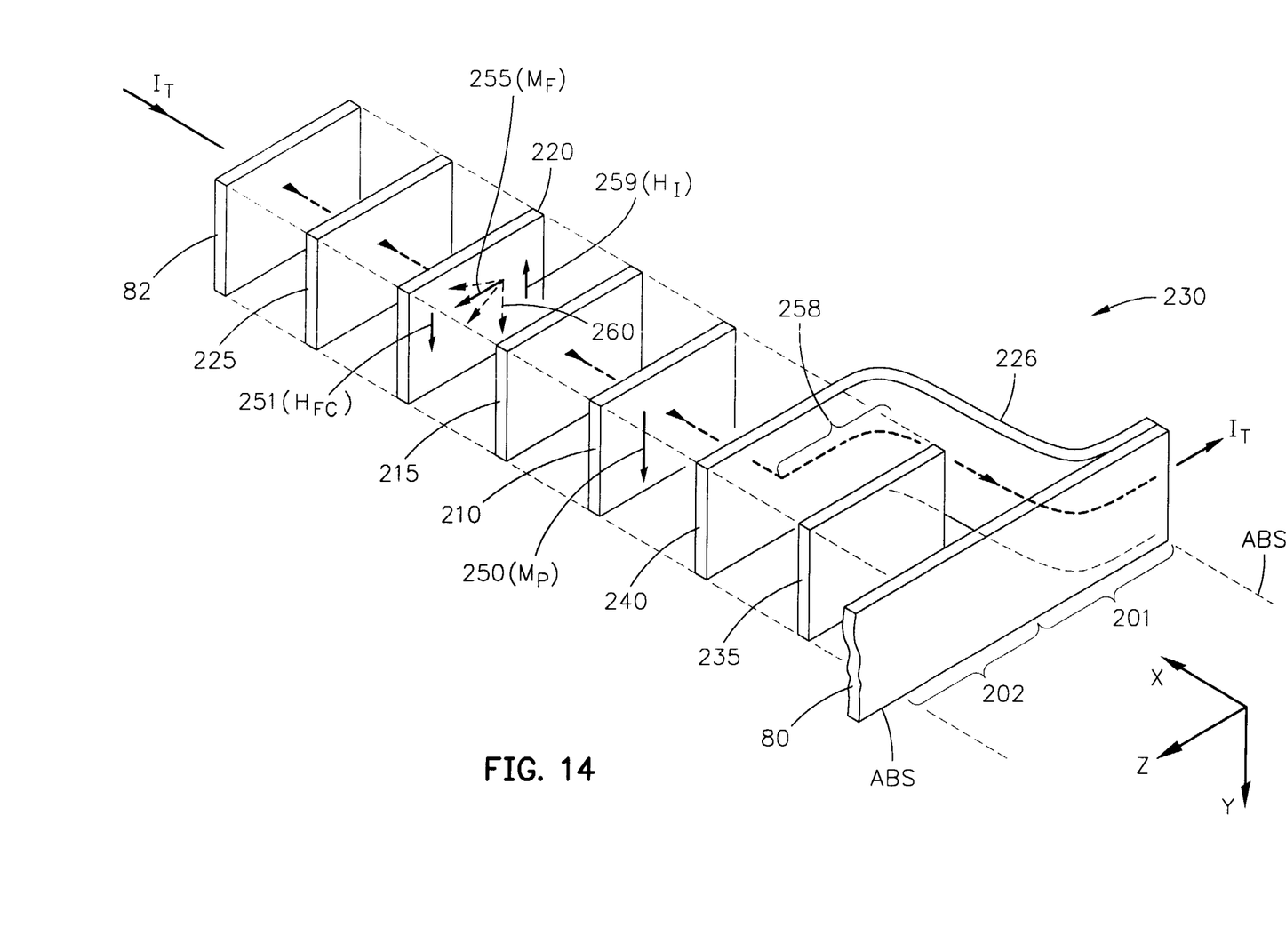
FIG. 14 is an exploded view of FIG. 13.

FIG. 13 shows another embodiment of the tunnel junction sensor 230. This sensor 230 is similar to the sensor 200 described above but instead of the non-conductive antiferromagnetic pinning layer 205, a non-conductive insulation layer 235 is positioned between the first shield 80 and a conductive antiferromagnetic pinning layer 240. FIG. 14 is an exploded view of tunnel junction sensor 230 in FIG. 13 showing the layers and orientations of the magnetic moment ($M_P$) 250 of the pinned layer 210 and the magnetic moment ($M_F$) 255 of the free layer 220. The orientation of the magnetic moment ($M_P$) 250 of the pinned layer 210 is in a downward (+y direction) perpendicular to the ABS, the direction of the magnetic moment ($M_P$) 250 being pinned by interfacial exchange coupling with the adjacent pinning layer 240. In the preferred embodiment, the orientation of the magnetic moment ($M_F$) 255 of the free layer 220 is perpendicular to the orientation of the magnetic moment ($M_P$) 250 of the pinned layer 210 (i.e., the moment direction is parallel to the ABS). But, in the absence of any external magnetic fields, the orientation of the magnetic moment ($M_F$) 255 of the free layer 220 is parallel to the magnetic moment ($M_P$) 250, as shown at 260, due to a ferromagnetic coupling field ($H_{FC}$) 251 in the +y direction. To permit the magnetic moment ($M_F$) 255 to assume the preferred direction (perpendicular to the magnetic moment ($M_P$) 250), a field in the −y direction must be generated to counteract the ferromagnetic coupling field ($H_{FC}$) 251.

A tunneling sense current $I_T$, using spin dependent electron tunneling, flows through the tunnel junction sensor 230 in the −x direction, parallel to the ABS, with the first and second shield layers 80 and 82 used as leads. In the present invention, the tunnel current $I_T$ does not flow directly through the tunnel junction 230. Since the insulation layer 235 is non-conductive, the tunnel current $I_T$ is diverted 258, by the conductive shunt 226 in the −z direction along the track width in the plane of the pinning layer 240. While the current 258 is flowing in the pinning layer 240 in the −z direction, a tunneling sense current field ($H_I$) 259 is generated antiparallel to the ferromagnetic coupling field ($H_{FC}$) 251. The electrical connection between the pinning layer 240 and the first shield 80 is provided at a location 201 remote from the track width area 202 so that the current $I_T$ flows parallel to the ABS and parallel to the track width in the pinning layer 240. By balancing the tunneling sense current field ($H_I$) 259 and the ferromagnetic coupling field ($H_{FC}$) 251, the orientation of the magnetic moment ($M_F$) 255 of the free layer 220 is located parallel to the ABS as shown by the solid arrow. The amount of current $I_T$ that flows through the sensor is dependent on the relative magnetic directions ($M_P$) 250 and ($M_F$) 255 of the pinned layer 210 and the free layer 220. As the tunnel junction sensor 230 is positioned over the magnetic disk 34, the external magnetic fields sensed from the rotating disk 34 moves the direction of magnetic moment ($M_F$) 255 of the free layer 220 up or down, changing the resistance through the tunnel junction sensor 230. As the magnetic moment ($M_F$) 255 rotates up from the ABS (i.e., going toward the opposite direction of the magnetic moment ($M_P$)250), the amount of electron tunneling decreases (i.e., the resistance increases). As the magnetic moment ($M_F$) 255 rotates down toward the ABS (i.e., going toward the same direction as the magnetic moment ($M_P$) 250), the amount of electron tunneling increases (i.e., the resistance decreases). As the tunnel current $I_T$ is conducted through the sensor 230, the increase and decrease of electron tunneling (i.e., increase and decrease in resistance) are manifested as potential changes. These potential changes are then processed as readback signals by the processing circuitry shown in FIG. 3.

The insulation layer 235 may be made of alumina ($Al_2O_3$) having a thickness of 20–60 Å, with a preferred thickness of 40 Å. The pinning layer 240 may be made of a conductive antiferromagnetic material such as iron manganese (FeMn), having a thickness range of 50–150 Å, preferably 100 Å. Other conductive antiferromagnetic materials (AFM) such as nickel manganese (NiMn), platinum manganese (PtMn), iridium manganese (IrMn), chromium aluminum manganese (CrAlMn) or palladium manganese (PdMn) may be used for the pinning layer 240. The inductive write head 70 is then formed on the tunnel junction read sensor 230 (or read head 72, see FIGS. 6 or 7).

To fabricate the tunnel junction 230, the first shield 80 is first deposited. An insulation layer 235 is deposited over the first shield 80. A via or shunt 226 is patterned in the insulation layer 235. Next is the pining layer 240 deposited on the insulation layer 235 with the pinning layer 240 making contact with the shield 80 in the via 226. The pinned layer 210 is deposited on the pinning layer 240. The tunnel junction barrier layer 215 is deposited on the pinned layer 210. Using a lift-off technique, the free layer 220 is deposited on the barrier layer 215. A hard bias layer 221 and an isolation layer 225 are then deposited. The second shield 82 is deposited on the isolation layer 225. Electrical current flows from the second shield 82 to the free layer 220 and then the current tunnels to the pinned layer 210 across the barrier 215. Current then flows parallel to the ABS in the pinning layer 240 and the pinned layer 210 to the via 226 and finally reaches the first shield 80 at 201.

Clearly, other embodiments and modifications of this invention will occur readily to those of ordinary skill in the art in view of these teachings. While the description of the tunnel junction sensor is described in relation to a magnetic disk drive read/write head, it should understood that in other applications, the tunnel junction sensor may be used alone or in combination with other devices. Therefore, the disclosed invention is to be considered merely illustrative and limited in scope only as specified in the appended claims.

What is claimed is:

1. A tunnel junction sensor that has a track width at an air bearing surface (ABS) comprising:

a ferromagnetic electrically conductive free layer;

a non-magnetic insulating barrier layer;
a ferromagnetic electrically conductive pinned layer;
the barrier layer being located between the free layer and the pinned layer;
an antiferromagnetic pinning layer;
a ferromagnetic electrically conductive first shield layer;
the pinning layer being located between the first shield layer and the pinned layer and exchange coupled to the pinned layer so as to pin the pinned layer magnetic moment of the pinned layer in a first direction, which, in turn, exerts a ferromagnetic coupling field on the free layer in a first direction;
the first shield layer having an extended portion that extends beyond said track width of the sensor; and
one of the pinned layer or the pinning layer being electrically connected to said extended portion of the first shield layer for enabling a tunneling sense current to flow parallel to the ABS in said one of the pinned layer or the pinning layer for causing a tunneling sense current field to be exerted by said one of the pinned layer or the pinning layer on the free layer in a second direction that is antiparallel to said first direction to counter balance the ferromagnetic coupling field on the free layer.

2. The tunnel junction sensor as claimed in claim 1 further comprising:
a non-conductive insulation layer being located between the antiferromagnetic pinning layer and the first shield layer in the track width: and
59the antiferromagnetic pinning layer is electrically conductive and connects to said extended portion of the first shield layer.

3. The tunnel junction sensor as claimed in claim 2 wherein the electrically conductive antiferromagnetic pinning layer is selected from the group MnFe, NiMn, IrMn, PtMn, CrAlMn and PdMn.

4. The tunnel junction sensor as claimed in claim 2 wherein the non-conductive insulation layer is made from alumina ($Al_2O_3$).

5. The tunnel junction sensor as claimed in claim 1 wherein the pinned layer is connected to said extended portion of the ferromagnetic electrically conductive first shield layer beyond the track width and the antiferromagnetic pinning layer is non-conductive.

6. The tunnel junction sensor as claimed in claim 5 wherein the non-conductive antiferromagnetic pinning layer is made from nickel oxide (NiO).

7. The tunnel junction sensor as claimed in claim 1 further comprising:
a ferromagnetic electrically conductive second shield layer;
an isolation layer, the isolation layer being located between the second shield layer and the free layer; and
a tunneling sense current source for applying said tunneling sense current.

8. The tunnel junction sensor as claimed in claim 7 wherein the ferromagnetic electrically conductive first and second shield layers are used as electrical leads.

9. The tunnel junction sensor as claimed in claim 1 wherein the barrier layer has a thickness from 10 Å to 30 Å.

10. The tunnel junction sensor as claimed in claim 9 wherein the barrier layer is made from aluminum oxide.

11. The tunnel junction sensor as claimed in claim 1 wherein the first direction is normal to the ABS.

12. A magnetic head assembly that has an air bearing surface (ABS) comprising:
a read head that includes:
a tunnel junction sensor that has a track width responsive to applied magnetic fields;
first and second electrically conductive lead layers connected to the tunnel junction sensor for conducting a tunnel current through the tunnel junction sensor; the tunnel junction sensor including:
ferromagnetic electrically conductive first and second shield layers;
an isolation layer;
a ferromagnetic electrically conductive free layer;
the isolation layer being located between the second shield layer and the free layer;
a non-magnetic electrically insulating barrier layer;
a ferromagnetic electrically conductive pinned layer;
the barrier layer being located between the free layer and the pinned layer;
an antiferromagnetic pinning layer;
the pinning layer being located between the first shield layer and the pinned layer and exchange coupled to the pinned layer so as to pin the pinned layer magnetic moment of the pinned layer in a first direction which, in turn, exerts a ferromagnetic coupling field on the free layer in a first direction;
the first shield layer having an extended portion that extends beyond said track width of the sensor; and
one of the pinned layer or the pinning layer being electrically connected to said extended portion of the first shield layer for enabling a tunneling sense current to flow parallel to the ABS in said one of the pinned layer or the pinning layer for causing a tunneling sense current field to be exerted by said one of the pinned layer or the pinning layer on the free layer in a second direction that is antiparallel to said first direction to counter balance the ferromagnetic coupling field on the free layer;
a write head including:
first and second pole piece layers and a write gap layer;
the first and second pole piece layers being separated by the write gap layer at the ABS and connected at a back gap that is recessed rearwardly in the write head from the ABS;
an insulation stack having at least first and second insulation layers;
at least one coil layer embedded in the insulation stack; and
the insulation stack and the at least one coil layer being located between the first and second pole piece layers.

13. The magnetic head assembly as claimed in claim 12 wherein the first and second electrically conductive lead layers are the electrically conductive first and second shield layers.

14. The magnetic head assembly as claimed in claim 12 further comprising;
a non-conductive insulation layer being located between the antiferromagnetic pinning layer and the first shield layer in the track width; and
the antiferromagnetic pinning layer is electrically conductive and connects to said extended portion of the first shield layer.

15. The magnetic head assembly as claimed in claim 14 wherein the electrically conductive antiferromagnetic pinning layer is selected from the group MnFe, NiMn, IrMn, PtMn, CrAlMn and PdMn.

16. The magnetic head assembly as claimed in claim 14 wherein the non-conductive insulation layer is made from alumina ($Al_2O_3$).

17. The magnetic head assembly as claimed in claim 12 wherein the pinned layer is connected to said extended portion of the ferromagnetic electrically conductive first shield layer beyond the track width and the antiferromagnetic pinning layer is non-conductive.

18. The magnetic head assembly as claimed in claim 17 wherein the non-conductive antiferromagnetic pinning layer is made from nickel oxide (NiO).

19. The magnetic head assembly as claimed in claim 12 wherein the barrier layer has a thickness from 10 Å to 30 Å.

20. The magnetic head assembly as claimed in claim 19 wherein the barrier layer is made from aluminum oxide.

21. The magnetic head assembly as claimed in claim 12 wherein the first direction is normal to the ABS.

22. A magnetic disk drive that includes at least one magnetic head assembly that has an air bearing surface (ABS), the disk drive comprising:
   a read head that includes:
      a tunnel junction sensor that has a track width responsive to applied magnetic fields; and
      first and second electrically conductive lead layers connected to the tunnel junction sensor for conducting a tunnel current through the tunnel junction sensor; the tunnel junction sensor including:
         ferromagnetic electrically conductive first and second shield layers;
         a ferromagnetic electrically conductive free layer;
         a non-magnetic electrically insulating barrier layer;
         a ferromagnetic electrically conductive pinned layer;
         the free layer being located between the second shield and the barrier layer and the barrier layer being located between the free layer and the pinned layer;
         an antiferromagnetic pinning layer;
         the pinning layer being located between the first shield layer and the pinned layer and exchange coupled to the pinned layer so as to pin the pinned layer magnetic moment of the pinned layer in a first direction which, in turn, exerts a ferromagnetic coupling field on the free layer in a first direction;
         the first shield layer having an extended portion that extends beyond said track width of the sensor; and
         one of the pinned layer or the pinning layer being electrically connected to said extended portion of the first shield layer for enabling a tunneling sense current to flow parallel to the ABS in said one of the pinned layer or the pinning layer for causing a tunneling sense current field to be exerted by said one of the pinned layer or the pinning layer on the free layer in a second direction that is antiparallel to said first direction to counter balance the ferromagnetic coupling field on the free layer;
   a write head including:
      first and second pole piece layers and a write gap layer;
      the first and second pole piece layers being separated by the write gap layer at the ABS and connected at a back gap that is recessed rearwardly in the write head from the ABS;
      an insulation stack having at least first and second insulation layers;
      at least one coil layer embedded in the insulation stack; and
      the insulation stack and the at least one coil layer being located between the first and second pole piece layers;
   a housing;
   a magnetic disk rotatably supported in the housing;
   a support mounted in the housing for supporting the magnetic head with its ABS facing the magnetic disk so that the magnetic head is in a transducing relationship with the magnetic disk;
   means for rotating the magnetic disk;
   positioning means connected to the support for moving the magnetic head to multiple positions with respect to said magnetic disk; and
   processing means connected to the magnetic head, to the means for rotating the magnetic disk and to the positioning means for exchanging signals with said at least one magnetic head assembly for controlling movement of the magnetic disk and for controlling the position of said at least one magnetic head assembly.

23. The magnetic disk drive as claimed in claim 22 wherein the processing means is connected to the first and second lead layers for applying the tunneling sense current to the sensor.

24. The magnetic disk drive as claimed in claim 23 wherein the processing means applies said tunneling sense current.

25. The magnetic disk drive as claimed in claim 22 wherein the first and second electrically conductive lead layers are the electrically conductive first and second shield layers.

26. The magnetic disk drive as claimed in claim 22 further comprising:
   a non-conductive insulation layer is located between the antiferromagnetic pinning layer and the first shield layer in the track width; and
   the antiferromagnetic pinning layer is electrically conductive and connects to said extended portion of the first shield layer.

27. The magnetic disk drive as claimed in claim 26 wherein the electrically conductive antiferromagnetic pinning layer is selected from the group MnFe, NiMn, IrMn, PtMn, CrAlMn and PdMn.

28. The magnetic disk drive as claimed in claim 26 wherein the non-conductive insulation layer is made from alumina ($Al_2O_3$).

29. The magnetic disk drive as claimed in claim 22 wherein the pinned layer connects to said extended portion of the ferromagnetic electrically conductive first shield layer and the antiferromagnetic pinning layer is non-conductive.

30. The magnetic disk drive as claimed in claim 29 wherein the non-conductive antiferromagnetic pinning layer is made from nickel oxide (NiO).

31. The magnetic disk drive as claimed in claim 22 wherein the barrier layer has a thickness from 10 Å to 30 Å.

32. The magnetic disk drive as claimed in claim 31 wherein the barrier layer is made from aluminum oxide.

33. The magnetic disk drive as claimed in claim 22 wherein the first direction is normal to the ABS.

34. A method of making a tunnel junction sensor that has a track width at an air bearing surface (ABS) comprising:
   forming a ferromagnetic electrically conductive first shield layer;
   forming an antiferromagnetic pinning layer on the first shield layer;
   forming a ferromagnetic electrically conductive pinned layer on the pinning layer;
   forming a non-magnetic electrically insulating barrier layer on the pinned layer;
   forming a ferromagnetic electrically conductive free layer on the barrier layer;

the pinning layer being exchange coupled to the pinned layer so as to pin the pinned layer magnetic moment of the pinned layer in a first direction which, in turn, exerts a ferromagnetic coupling field on the free layer in a first direction;

the first shield layer having an extended portion that extends beyond said track width of the sensor; and electrically connecting one of the pinned layer or the pinning layer to said extended portion of the first shield layer for enabling a tunneling sense current to flow parallel to the ABS in said one of the pinned layer or the pinning layer for causing a tunneling sense current field to be exerted by said one of the pinned layer or the pinning layer on the free layer in a second direction that is antiparallel to said first direction to counter balance the ferromagnetic coupling field on the free layer.

35. The method as claimed in claim 34 further comprising:

forming a non-conductive insulation layer on the first shield layer between the first shield layer and the antiferromagnetic pinning layer in the track width; and connecting the antiferromagnetic pinning layer to said extended portion of the first shield layer wherein the antiferromagnetic pinning layer is electrically conductive.

36. The method as claimed in claim 35 wherein the electrically conductive antiferromagnetic pinning layer is selected from the group MnFe, NiMn, IrMn, PtMn, CrAlMn and PdMn.

37. The method as claimed in claim 35 wherein the non-conductive insulation layer is made from alumina ($Al_2O_3$).

38. The method as claimed in claim 34 including connecting the pinned layer to said extended portion of the ferromagnetic electrically conductive first shield layer wherein the antiferromagnetic pinning layer is non-conductive.

39. The method as claimed in claim 38 wherein the non-conductive antiferromagnetic pinning layer is made from nickel oxide (NiO).

40. The method as claimed in claim 34 further comprising:

forming an isolation layer on the free layer:

forming a second shield layer on the isolation layer; and providing a tunneling sense current source for applying a tunneling sense current.

41. The method as claimed in claim 40 wherein the ferromagnetic electrically conductive first and second shield layers are used as electrical leads.

42. The method as claimed in claim 34 wherein the barrier layer has a thickness from 10 Å to 30 Å.

43. The method as claimed in claim 42 wherein the barrier layer is made from aluminum oxide.

44. The method as claimed in claim 34 wherein the first direction is normal to the ABS.

45. A method of making a magnetic head that has an air bearing surface (ABS) comprising:

forming a tunnel junction sensor that has a track width as follows:

forming a ferromagnetic electrically conductive first shield layer;

forming an antiferromagnetic pinning layer on the first shield layer;

forming a ferromagnetic electrically conductive pinned layer on the pinning layer;

forming a non-magnetic electrically insulating barrier layer on the pinned layer;

forming a ferromagnetic electrically conductive free layer on the barrier layer;

forming an isolation layer on the free layer;

forming a ferromagnetic electrically conductive second shield layer on the isolation layer;

the pinning layer being exchange coupled to the pinned layer so as to pin the pinned layer magnetic moment of the pinned layer in a first direction which, in turn, exerts a ferromagnetic coupling field on the free layer in a first direction;

the first shield layer having an extended portion that extends beyond said track width of the sensor; and electrically connecting one of the pinned layer or the pinning layer to said extended portion of the first shield layer for enabling a tunneling sense current to flow parallel to the ABS in said one of the pinned layer or the pinning layer for causing a tunneling sense current field to be exerted by said one of the pinned layer or the pinning layer on the free layer in a second direction that is antiparallel to said first direction to counter balance the ferromagnetic coupling field on the free layer; and forming a write head as follows:

forming a write gap layer and an insulation stack with a coil layer embedded therein on the second shield layer so that the second shield layer also functions as a first pole piece for the write head; and forming a second pole piece layer on the insulation stack and the write gap and connected at a back gap to the first pole piece.

46. The method as claimed in claim 45 further comprising:

forming a non-conductive insulation layer on the first shield layer between the first shield layer and the antiferromagnetic pinning layer in the track width; and connecting the antiferromagnetic pinning layer to said extended portion of the first shield layer wherein the antiferromagnetic pinning layer is electrically conductive.

47. The method as claimed in claim 46 wherein the electrically conductive antiferromagnetic pinning layer is selected from the group MnFe, NiMn, IrMn, PtMn, CrAlMn and PdMn.

48. The method as claimed in claim 46 wherein the non-conductive insulation layer is made from alumina ($Al_2O_3$).

49. The method as claimed in claim 45 including connecting the pinned layer to said extended portion of the ferromagnetic electrically conductive first shield layer wherein the antiferromagnetic pinning layer is non-conductive.

50. The method as claimed in claim 49 wherein the non-conductive antiferromagnetic pinning layer is made from nickel oxide (NiO).

51. The method as claimed in claim 45 further comprising:

providing a tunneling sense current source for applying the tunneling sense current.

52. The method as claimed in claim 51 wherein the ferromagnetic electrically conductive first and second shield layers are used as electrical leads.

53. The method as claimed in claim 45 wherein the barrier layer has a thickness from 10 Å to 30 Å.

54. The method as claimed in claim 53 wherein the barrier layer is made from aluminum oxide.

55. The method as claimed in claim 45 wherein the first direction is normal to the ABS.

* * * * *